(12) United States Patent
Manohar et al.

(10) Patent No.: US 9,349,202 B1
(45) Date of Patent: May 24, 2016

(54) DIGITAL CONVERSION OF IMAGED CONTENT

(71) Applicant: AMAZON TECHNOLOGIES, INC., Reno, NV (US)

(72) Inventors: Vasant Manohar, Tamil Nadu (IN); Viswanath Sankaranarayanan, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 129 days.

(21) Appl. No.: 13/632,864

(22) Filed: Oct. 1, 2012

(51) Int. Cl.
  *G06T 11/00* (2006.01)
  *G06T 11/60* (2006.01)
(52) U.S. Cl.
  CPC .................................... *G06T 11/60* (2013.01)

(58) Field of Classification Search
  None
  See application file for complete search history.

(56) References Cited

U.S. PATENT DOCUMENTS

| | | | | |
|---|---|---|---|---|
| 5,748,805 | A * | 5/1998 | Withgott et al. | 382/306 |
| 2002/0120654 | A1 * | 8/2002 | Xu | 707/536 |
| 2007/0237401 | A1 * | 10/2007 | Coath et al. | 382/232 |
| 2008/0100624 | A1 * | 5/2008 | Matsunaga | 345/469.1 |
| 2011/0043652 | A1 * | 2/2011 | King et al. | 348/222.1 |
| 2011/0296292 | A1 * | 12/2011 | Narayanan et al. | 715/234 |

* cited by examiner

*Primary Examiner* — James A Thompson
*Assistant Examiner* — Xilin Guo
(74) *Attorney, Agent, or Firm* — Lowenstein Sandler LLP

(57) ABSTRACT

A method of generating a reflowable content file from a physical text source is described. An image of the physical text source is segmented into a plurality of glyphs and a character and font is determined for each of the glyphs. The font for each of the plurality of glyphs is determined based on two or more of the glyphs.

20 Claims, 4 Drawing Sheets

DIGITAL CONVERSION OF IMAGED CONTENT

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Converting the content of a physical book into a digital format may be a time-consuming process. Further, information, such as the original fonts, may be lost in the conversion process, resulting in digital content that does not fully represent the content of the physical book.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Embodiments of a method for converting the content of a physical book into a digital format are described. The method includes imaging a page of the physical book and determining the font of characters in the resulting image. Thus, the original font (or fonts) of the content of the physical book are retained in the digital representation. The font of the characters are determined using contextual information besides the image of the characters themselves, such as the font of neighboring characters or the font of characters in similar paragraphs. Using contextual information reduces the negative influence of distortion and noise that may be introduced by the imaging and allows for the font of each character to be determined more accurately. Accurate determination of the font for each character results in a more accurate and consistent representation of the content of the physical book when converted into a digital format.

Figure 1:
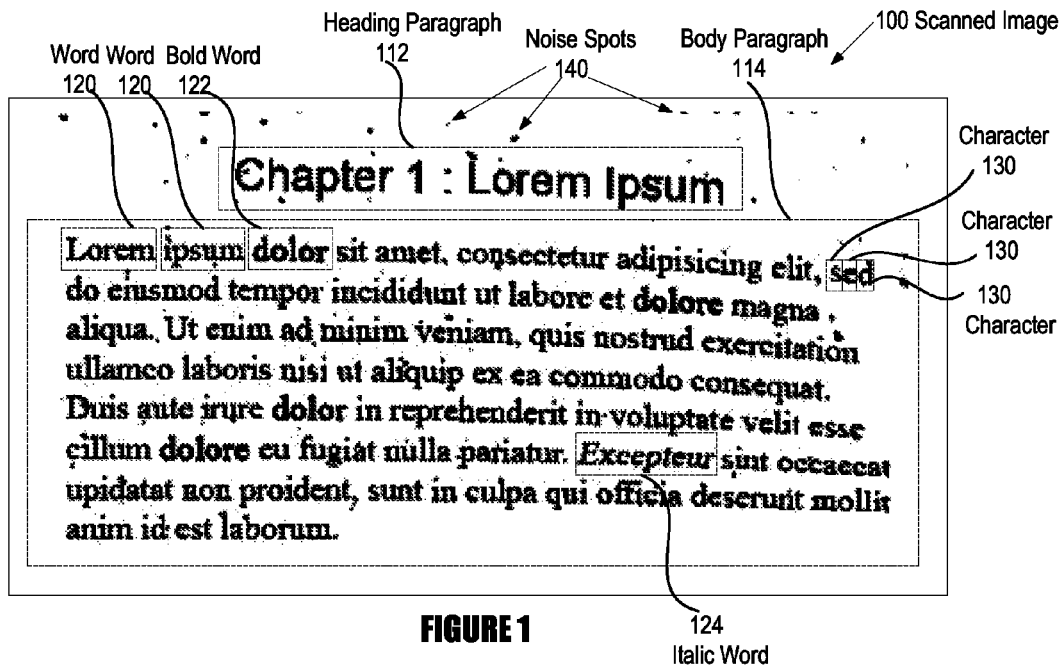
FIG. 1 illustrates an embodiment of an image of a portion of a physical book.

FIG. 1 illustrates an image 100 of a portion of a physical book. The image illustrates textual content of the physical book and includes two paragraphs, a heading paragraph 112 and a body paragraph 114. Other images of portions of a physical book may include more body paragraphs or no heading paragraph or other types of paragraphs. Each paragraph includes multiple words 120 and each word includes one or more characters 130. The body paragraph 114 includes a number of bold words 122 and an italic word 124. Other paragraphs may include more or fewer bold words 122 or italic words 124 or may not include bold words 122 or italic words 124 or may include other types of words.

The image 110 may be generated by imaging a physical page of a book or a portion thereof. For example, the image 110 may be generated using a scanner or a camera. The image 110 may be generated by imaging other text sources or generated by other methods. Imaging a physical text source, such as a book, may result in distortion of the text or the introduction of other noise which decrease the readability of the text. For example, in the image 110 of FIG. 1, the body paragraph 114 is warped such that the right side of the paragraph tends to slope downwards. This may occur, for example, if the book binding prevents the book from being laid flat on the bed of a scanner. Further, the image 110 includes a number of noise spots 140. Other images may have different distortions or include other types of noise.

The image 110 may be a two-dimensional matrix of pixels, referred to as a bitmap, each of the pixels having a value corresponding to its brightness. The image 110 may be other image types. The image 110 may be stored and rendered on the display of an electronic device for consumption by a user. However, bitmap image files may take up a large amount of memory. Further, directly rendering the image 110 retains the distortion and noise introduced by the imaging. Direct rendering of the image may also result in pixilation at high zoom levels. Thus, the rendering of the image 110 would have decreased readability and fail to properly represent the original content from the text source. Directly rendering the image 110 is further limited in that the image 110 cannot be reflowed.

In one embodiment, the image 110 is converted into a vector image. The vector image may be a set of values defining a plurality of vectors or lines. In one embodiment, the vector image is a set of values defining a plurality of Bezier curves. It is to be appreciated that, as used herein, the term "line" and the term "curve" both includes straight lines and straight line segments as well as lines and segments with non-zero curvature. The curves may be defined as a mathematical formula or parameters to be rendered using a predetermined formula. For example, the curves may be defined by a Bezier curve or Bezier control points to be used in rendering a Bezier curve.

In general, a vector image takes up less memory than a bitmap (or raster) image. However, rendering the vector image, without further processing, would retain the distortion and noise introduced by the imaging. Thus, the rendering of the vector image would, like the direct rendering of the image 110, have decreased readability and fail to properly represent the original text from the text source.

In one embodiment, the vector image is segmented into character blocks, each character block being a portion of the image containing a glyph representing a character. In particular, each character block is a portion of the image containing a glyph representing a character. As used herein, and illustrated further below, a glyph representing a character may include a plurality of shapes, each referable to as a glyph. For example, a glyph may represent the character "ñ", whereas both the "n" and the tilde "~" above the "n" may be considered glyphs. In another embodiment, the image 110 is segmented into character blocks without vectorization. Then, each of the character blocks is analyzed to determine the character corresponding to and represented by the glyph in the character block, e.g. which character the glyph represents. A character may be a letter, such as "a", "b", "c", "π", "Ж" or "ٮ". A character may be a ligature corresponding to more than one letter, such as "æ" or "ꜽ". A character may be a symbol, such as "$", "#" or "¶". A character may represent other typographical shapes than those mentioned above.

Although many of the embodiments described below are discussed and illustrated with respect to the Roman alphabet, it is to be appreciated that other character sets may be used, including but not limited to Greek, Hebrew, Cyrillic, Arabic and Asian character sets such as hiragana, katakana and kanji.

The determined characters may be stored as an unformatted text file. The characters may be stored as a series of numbers representing the characters, such as an ASCII (American Standard Code for Information Interchange) or a Unicode file format. A text rendering engine may be used to render the text on an electronic device using a default font or a user-selected font. Although rendering the unformatted text file potentially removes the distortion and noise introduced by the imaging, it also removes the different fonts used in the original text. For example, rendering the characters alone (as stored in an unformatted text file) would not render the heading paragraph 112 in a different font from the body paragraph 114. As a further example, rendering the characters alone would not render the bold words 122 differently than the other words.

In one embodiment, each of the character blocks is analyzed to determine the character represented by the glyph in the character block and is further analyzed to determine the font of the glyph. The determined font of the glyph may include a font size and a font typeface. The determined font may include less or additional other font information. The determined characters and fonts may be stored as a formatted text file. For example, the formatted text file may be an RTF (Rich Text Format) file, a TeX file or another formatted text file type. A text rendering engine may used to render the text on an electronic device. Although rendering the formatted text file potentially maintains the different fonts used in the original text, the effects of the distortion and noise are more pronounced than rendering an unformatted text file. For example, an inconveniently placed noise spot 140 may cause a glyph to be determined as a different typeface (e.g., bold italic Times New Roman) than a neighboring glyph in the same word (e.g., determined as italic Times New Roman). Distortion may also cause a glyph to be determined as a different font typeface than a neighboring glyph in the same word. As another example, the distortion may cause a glyph to be determined to have a different font size (e.g., 11 pt) than the size of a neighboring glyph in the same word (e.g., 12 pt). Distortion and other noise may cause other misdeterminations.

In one embodiment, the vector image is segmented into paragraph blocks, line blocks, word blocks and character blocks. In another embodiment, the original image 110 is segmented without vectorization. Each paragraph block is a portion of the image containing a paragraph, each line block is a portion of the image containing a line, each word block is a portion of the image containing a word and each character block is a portion of the image containing a glyph representing a character. Each of the character blocks is analyzed to determine the character represented by the glyph in the character block and are further analyzed to determine the font of the glyph. However, rather than determining the character or the font by only looking at the character block, additional contextual information, such as the word block and paragraph block that the glyph is in, are used to more accurately determine the character and to more accurately determine the font of the glyph. For example, the character may be accurately determined by presuming that it is more likely that the characters of a word form a pattern found in a dictionary than that the characters of the words form a random pattern. As another example, the font of a glyph may be more accurately determined by presuming that every glyph in a word will have the same font size and font typeface. As another example, the font of a glyph may be more accurately determined by presuming that most words in a paragraph will have the same font size and same font typeface and that all of the words will have a font typeface in the same typeface family (e.g., bold and italic variants of a base typeface). Other contextual information may be used to more accurately determine the character or font of a glyph. For example, it may be determined that a paragraph is a header paragraph 112 and it is more likely that the glyphs will have a font that is the same as the determined font for other header paragraphs. As another example, it may be determined that a glyph is an initial, a glyph representing the first character of a paragraph or chapter, and it is more likely that the glyph will have a font size that is the same as the font size of other initials, even if that font size is different from other glyphs in the word or paragraph. Still other contextual information may be used to determine the character or font of a glyph.

Figure 2:
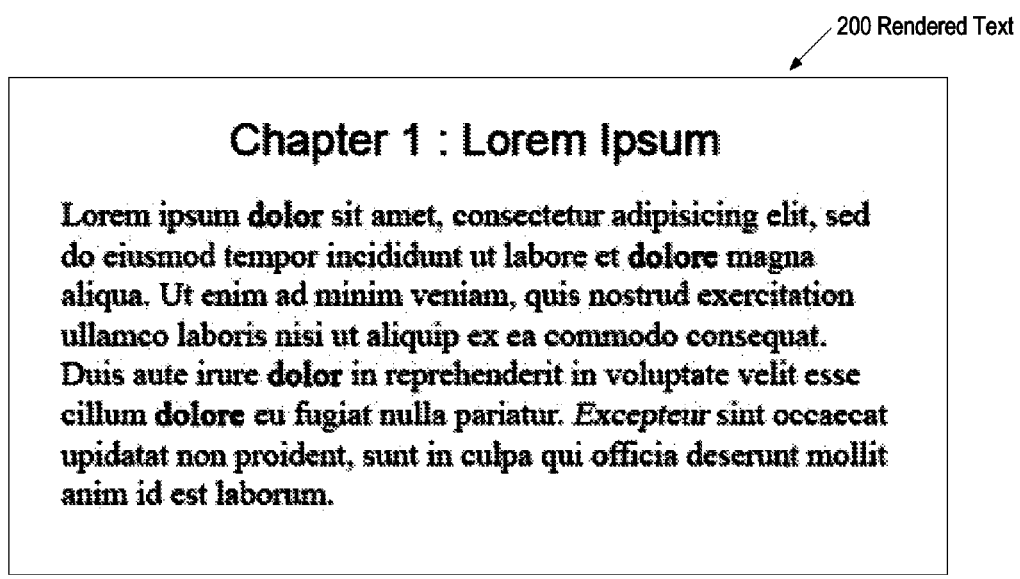
FIG. 2 illustrates an embodiment of an image of rendered text formed from the scanned image of FIG. 1.

By using additional contextual information, the character and font of the glyph in each character block can be more accurately determined. This information may be stored in a formatted text file. This information may be stored in other ways, as described below. For example, the information may be used to generate a cleaned bitmap or vector image file. FIG. 2 illustrates an image of rendered text that may be formed by rendering the formatted text file (or by displaying the cleaned bitmap or vector image file) generated by analyzing the image 110. Rendering the formatted text file (or displaying the cleaned bitmap or vector image file) more accurately displays the original text from the text source and has increased readability.

Figure 3:
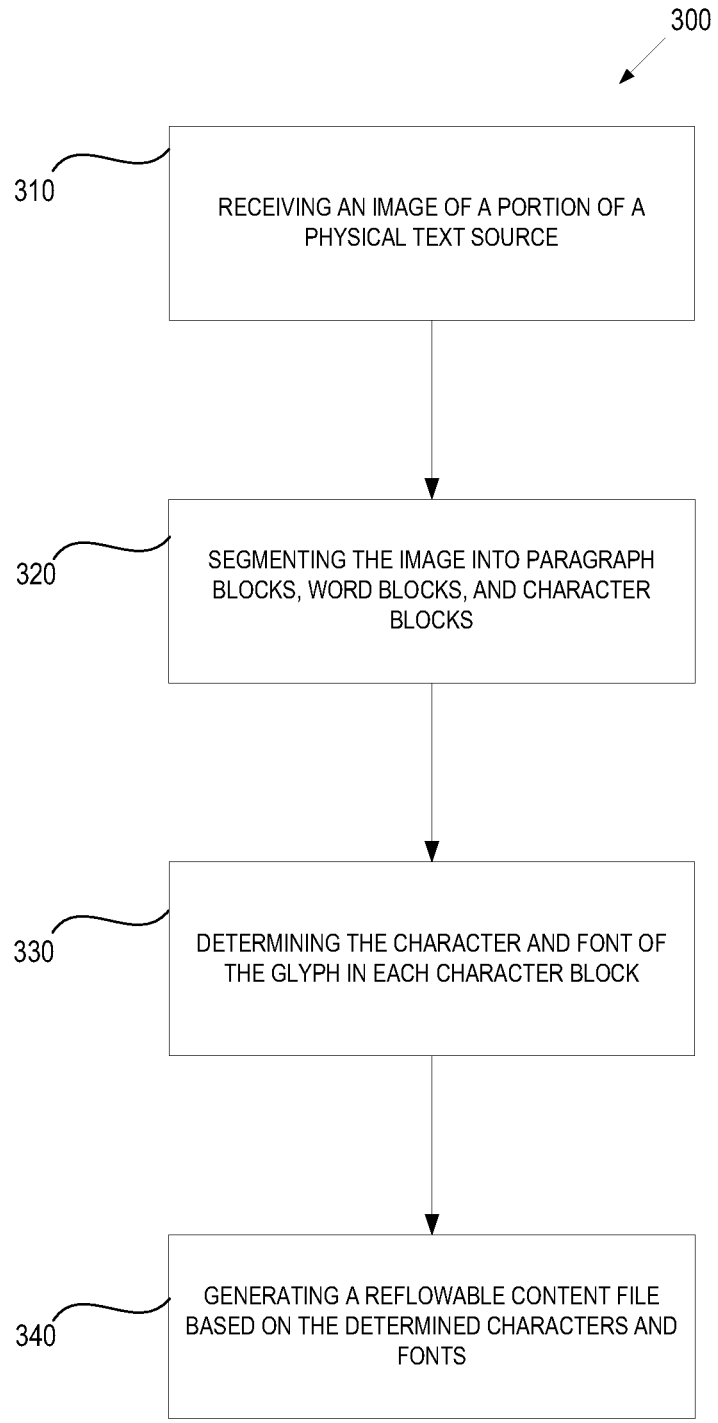
FIG. 3 illustrates a flowchart of an embodiment of a method of generating a reflowable content file.

FIG. 3 illustrates a flowchart of an embodiment of a method 300 for generating a reflowable content file. The method 300 begins, in block 310, with receiving an image or at least a portion of a physical text source. The physical text source may be, for example, a book, a magazine, a newspaper, a letter or any other source of text. The image may be received by scanning the portion of the physical text source with a scanner. The image may be received by taking a picture of the portion of the physical text source with a camera. The image may be received by downloading the image from a remote server or accessing the image from a local memory. The image may be obtained by other methods.

In block 320, the image is segmented into paragraph blocks, lines blocks, word blocks and character blocks. In one embodiment, the image is vectorized before being segmented. Each paragraph block is a portion of the image containing a paragraph. Each paragraph contains a number of lines (and space between the lines) and each line block is a portion of the image containing one of the lines. Each line contains a number of words (and spaces between the words) and each word block is a portion of the image containing one of the words. Each word contains one or more characters and each character block is a portion of the image containing a glyph representing one of the characters. In other embodiments, the image is only segmented into word blocks and character blocks; paragraph blocks and line blocks are not determined. In other embodiments, the image is segmented into different partitions. Although a paragraph may be body text, it is to be appreciated that the term "paragraph" is not so limited and may refer to, among other things, a header, a footer, a footnote, a body paragraph, a caption, an inset, an item of a list of items separated by line breaks or another collection of words.

In block 330, each of the character blocks is analyzed to determine the character represented by the glyph in the character block and is further analyzed to determine the font of the glyph. The character and font of each glyph are determined using not only the glyph of the character block, but additional contextual information provided by other glyphs. In particular, the font of each glyph is determined using two or more of glyphs. For example, the character and font may be determined based on the glyph of neighboring character blocks (such as those in the same word, same line or same paragraph) or the glyphs in character blocks in different words, lines or paragraphs. Character and font determination are described in further detail below with respect to FIG. 4.

In block 340, the determined characters and fonts are used to generate a reflowable content file. The reflowable content file may include a series of numbers representing characters and formatting information associated with each of the characters which, when rendered, represents the content of the physical text source. The formatting information may include, for example, a font size and a font typeface. In particular, the formatting information may include a designation of one or more font typefaces or shape information representing one or more font typefaces. The reflowable content file may include a series of numbers representing lines or curves (e.g., Bezier curves) which, when rendered, represents the content of the physical text source. In one embodiment, the reflowable content file is a Topaz file.

The reflowable content file may be a formatted text file. For example, the reflowable content file may be an RTF (Rich Text Format) file or a TeX file. The reflowable content file may be a mark-up file, such as an HTML (HyperText Markup Language) file or an XML (eXtensible Markup Language) file. The reflowable content file may be an ebook file, such as an MOBI file, a PRC file or an KF8 (Kindle Format 8) file. The reflowable content file may be other types of files.

Figure 4:
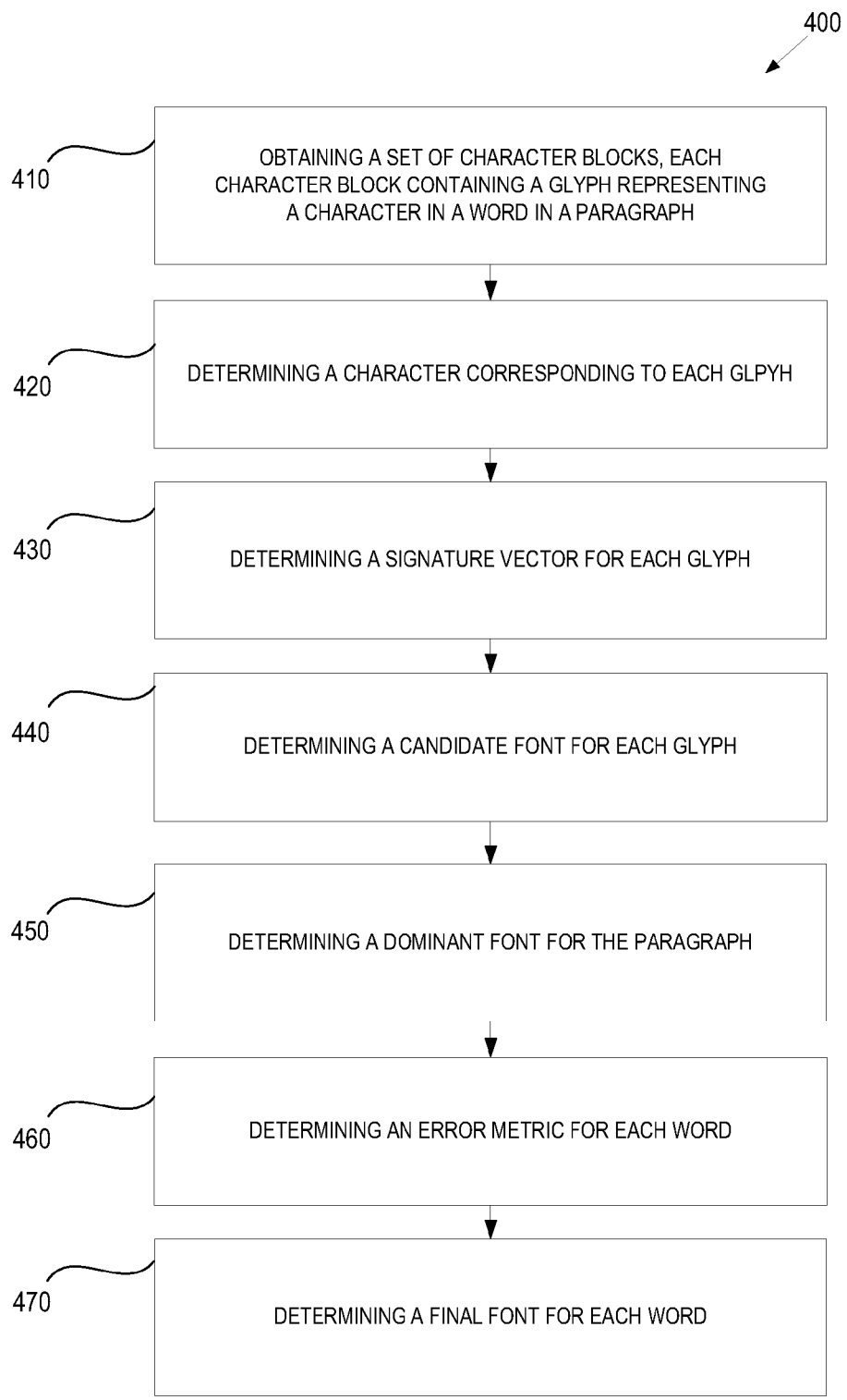
FIG. 4 illustrates a flowchart of an embodiment of a method of determining a character and a font for a set of glyphs.

FIG. 4 illustrates a flowchart of an embodiment of a method 400 for determining a character and a font for a set of glyphs. The method 400 begins, in block 410, with obtaining a set of character blocks, each character block containing a glyph representing a character. Each character block is associated with a word block and each word block contains a word with one or more characters. Each word block is associated with a paragraph block containing a paragraph with one or more words. The set of character blocks may be obtained by segmenting an image of a portion of a physical text source as described above with respect to FIG. 3.

In block 420, a character is determined corresponding to each glyph. The characters may be determined by analyzing the glyphs using optical character recognition (OCR) techniques. The characters may be determined by analyzing each character block individually or by analyzing more than one character block at once. For example, the characters in a word block may be determined by presuming that the characters in a word block are more likely to form a word in a dictionary than a random string.

In block 430, a signature vector is determined for each glyph. The signature vector is a collection of values generally representing the shape and appearance of the glyph. Thus, the signature vector is a collection of values indicative of shape and appearance characteristics of the glyph. In one embodiment, a value of the signature vector characterizing a glyph's appearance is determined as the average greyness of the glyph. In another embodiment, a value of the signature vector characterizing a glyph's appearance is determined based on the texture of the glyph. In one embodiment, a value of the signature vector characterizing a glyph's shape is determined as the location of the center-of-mass of the glyph. For example, the center-of-mass of the glyph "E" (the letter 'E' rendered in Times New Roman) would have a center-of-mass in a different location than the center-of-mass of the glyph "E" (the letter 'E' rendered in Impact). In one embodiment, other values of the signature vector are determined as higher-order moments of the glyphs. The moments may be centered or uncentered, normalized or unnormalized. The moments may include, for example, the mean, variance, skew or kurtosis of the shape of the glyph. In one embodiment, the signature vector includes the moments of the glyph from first-order to fourth-order. In one embodiment, a value of the signature vector is determined as the height of the glyph. For example, the height of the glyph "y" (the letter 'y' rendered in Times New Roman) would have a height greater than the glyph "y" (the letter 'y' rendered in Impact). As a further example, the height of a glyph may depend on the font size. A glyph with a larger font size may have a larger height than the same glyph with a smaller font size. Other values may be determined for the signature vector using image processing techniques or other methods.

In one embodiment, a character-specific signature vector is determined for the glyph. For example, the signature vector for the glyph "i" may have a value indicative of the distance between the base and the dot of the letter 'i', whereas the signature vector for the glyph "o" may have a value indicative of the circularity of the letter 'o'. Other values may be determined for the signature vectors of other characters.

Design of a generic signature vector or a character-specific signature vector, e.g. selecting what values are to be determined for a glyph, may be performed adaptively by analyzing a collection of glyphs. In one embodiment, a collection of glyphs, each having a different font typeface, but representing the same character is analyzed to determine a character-specific glyph. For example, independent component analysis may yield a small set of components which best represent the variability of the collection. The values to be determined may also be selected using user input, a feedback loop or adaptive algorithms. The signature vectors may be designed using other techniques.

In one embodiment, the steps described in blocks 420 and 430 are reversed and the signature vector is used to determine the character of each glyph.

In block 440, a candidate font is determined for each glyph. The candidate font may include a font size. For example, the font size may be 8 pt, 10 pt, 12 pt or any other value. The candidate font may include a font typeface. For example, the font typeface may be Courier, Arial, Arial Bold, Arial Italic, Time New Roman or any other typeface. The candidate font may more generally include a font typeface family. For example, the font typeface family may be Arial, including Arial Normal, Arial Bold, Arial Italic and other variants.

The candidate font may be determined by analyzing the shape and appearance characteristics of the glyphs, e.g., based on the signature vector. In one embodiment, the signature vector is compared to those in a database of signature vectors for glyphs of various fonts. In one embodiment, the signature vector is only compared to the signature vectors in the database having the same character for the glyph that was determined in block 420. Use of a signature vector as an efficient representation of the glyph enables fast comparison of the glyph to glyphs in the database to determine the candidate font.

The candidate font may be selected as the font in the database having a signature vector which most closely matches the signature vector of the glyph. The signature vector may be determined as that which most closely matches the signature vector of the glyph using a Euclidian distance metric, a 1-distance metric or other metric. In another embodiment, a set of candidate fonts is selected for each glyph. In one embodiment, the set of candidate fonts is selected as the set of fonts in the database having a signature vector which most closely matches the signature vector of the glyps.

In one embodiment, in addition to determining a candidate font for each glyph, a likelihood value is also determined based on the closeness of the signature vector of the glyph to the signature vector of the corresponding glyph of the determined candidate font.

In block 450, a single dominant font is determined for the paragraph. The dominant font for the paragraph is determined based on the candidate fonts of the characters in the paragraph. In one embodiment, the dominant font is determined as the most common candidate font of the characters in the paragraph. In another embodiment, the dominant font is determined using likelihood values such that the candidate font of glyphs having high likelihood values are given greater weight in determining the dominant font for the paragraph. In an embodiment in which a set of candidate fonts is selected for each glyph, the dominant font may be determined based on whether a particular font appears in the set of candidate fonts for a particular glyph. For example, the dominant font may be determined as the font which appears in the most sets of the candidate fonts. The dominant font may be determined using other set theory algorithms or other techniques.

In one embodiment, the dominant font for the paragraph is determined based on a paragraph type. For example, if it is determined that the paragraph is a footnote, the dominant font may be determined, at least in part, based on the font of other footnotes in the same book.

Determining a dominant font involves the candidate fonts of two or more glyphs. By determining a dominant font, font runs may be identified, enabling a more homogenous font and more consistent representation of the physical text source than would be obtained by assigning fonts to each glyph independently.

In block 460, an error metric is determined for each word. The error metric is determined by comparing the glyphs in the word to a representation of the word using the dominant font of the paragraph. In one embodiment, the error metric is indicative of the difference between the glyphs of the word and a representation of the word using the dominant font of the paragraph. In one embodiment, the signature vectors of the glyphs in the word are compared to the signature vectors of corresponding glyphs in the database with the dominant font. The error metric may, for example, be an average of the distance between the signature vectors of the glyphs in the word with the signature vectors of the corresponding glyphs with the dominant font. In another embodiment, the error metrics are determined by comparing the character blocks (as raster or vector images) to a rendering of the word using the dominant font.

In block 470, a final font is determined for each word. If the error metric is below a threshold, the final font is determined as the dominant font for the paragraph. If the error metric is greater than the threshold value, the final font is determined as a different font from the dominant font for the paragraph. In one embodiment, if the error metric for a word is greater than the threshold value, the final font for the word is determined as the most common font of the glyphs associated with other instances of the word in the book. In another embodiment, if the error metric for a word is greater than the threshold value, the final font for the word is determined as a variant of the dominant font (e.g., a bold variant, italic variant, underline variant, or strikethrough variant of the typeface) based on which of the variants yields the closest match. The threshold may be selected based on a likelihood that the glyphs of the word are part of the dominant font.

As noted above, in block 420, a character is determined for each glyph. In block 470, a font is determined for each glyph as the final font for the word associated with the glyph. Thus, after block 470 of the method 400, a character and font has been determined for each of the set of glyphs. The steps of the method described above may be performed automatically by a processing device without human interaction. However, in other embodiments, user input may be used to better determine a character or font of a glyph. As described above with respect to FIG. 3, the determined character and font for the glyphs can be used to generate a reflowable content file.

Figure 5:
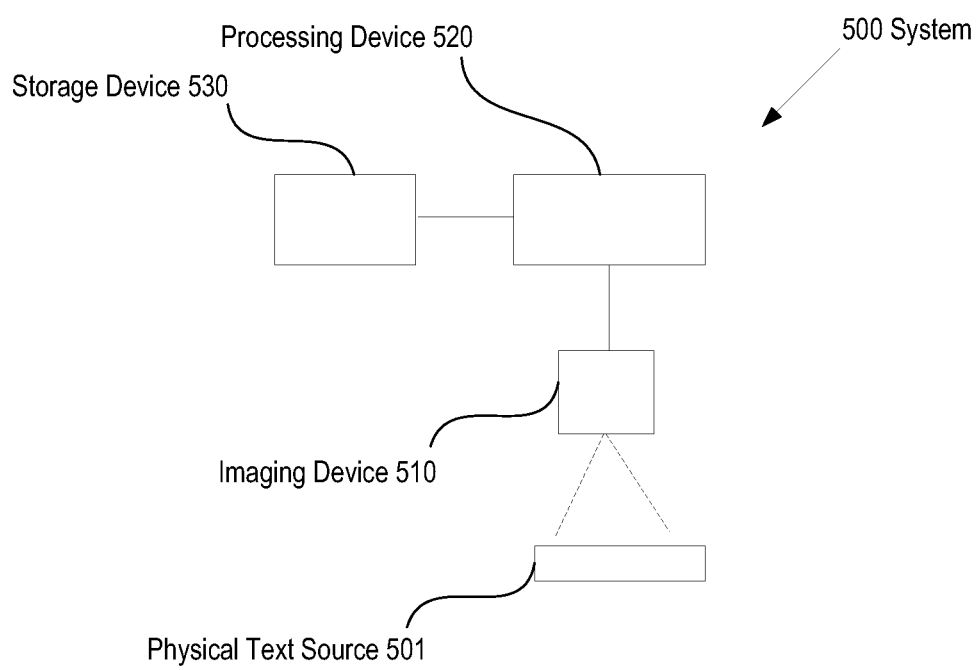
FIG. 5 illustrates a functional block diagram of an embodiment of a system for generating a reflowable content file.

FIG. 5 illustrates a function block diagram of a system 500 for generating a reflowable content file from a physical text source 501. The system 500 includes an imaging device 510 configured to generate an image of at least a portion of the physical text source 501. The imaging device 510 may be, for example, a flatbed scanner, a handheld scanner or a camera. In one embodiment, the imaging device 510 comprises a charge-coupled device (CCD). In another embodiment, the imaging device 510 comprises a contact image sensor (CIS). The imaging device 510 may include other light sensors or other devices for generating an image.

The imaging device 510 is coupled to a processing device 520 which receives the image and is configured to generate a reflowable content file based on the image. The processing device 520 may include one or more processing devices, such as one or more central processing units (CPUs), microcontrollers, field programmable gate arrays or other types of processing devices. The processing device 520 may communicate with the imaging device 510 to receive image data from the imaging device 510.

The system 500 also includes a storage device 530 coupled to the processing device 520 and configured to store data. For example, the processing device 520 may store the generated reflowable content file on the storage device 530. As another example, the storage device 530 may store a database of signature vectors. The storage device may include any combination of volatile and/or non-volatile storage devices. The storage device 530 may also be one or more types of removable storage and/or one or more types of non-removable storage. The storage device 530 may include one or more of read-only memory (ROM), flash memory, dynamic random access memory (DRAM) such as synchronous DRAM (SDRAM) or static random access memory (SRAM). The storage device 530 stores information which provides an operating system, various program modules, program data and/or other components. The storage device 530 may include a computer-readable storage medium on which is stored one or more sets of instructions embodying any one or more of the methodologies or functions described herein.

The foregoing description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method of generating a reflowable content file, the method comprising:
    receiving an image of at least a portion of a physical text source comprising textual content;
    segmenting the image into paragraph blocks, line blocks, word blocks and character blocks, a paragraph block representing a paragraph of the textual content, a line block representing a line of the textual content, a word block representing a word of the textual content and a character block comprising a glyph representing a character of the textual content;
    identifying a first character corresponding to a first glyph of a first word in a first paragraph, wherein the first glyph is one of a plurality of glyphs in the first paragraph;
    identifying a first font for the first glyph,
        wherein identifying the first font comprises:
            determining a signature vector for the first glyph;
            identifying a candidate font for the first glyph based at least in part on comparing the signature vector to a database of signature vectors;
            determining that the candidate font is a most commonly used font for the plurality of glyphs in the first paragraph;
            determining that the candidate font that is the most commonly used font is a dominant font for the first paragraph;
            determining an error metric for the first word of the first paragraph indicative of a difference between glyphs of the first word and a representation of the glyphs of the first word generated using the dominant font; and
            identifying a final font for the glyphs of the first word based on the error metric;
    identifying a second character corresponding to a second glyph of a second word in the first paragraph, wherein the second glyph is one of the plurality of glyphs in the first paragraph;
    identifying a second font for the second glyph, wherein the second font is different than the first font; and
    generating a reflowable content file including the first character, the second character, the first font and the second font.

2. The method of claim 1, wherein receiving the image comprises scanning a page of a book.

3. The method of claim 1, wherein the reflowable content file comprises a series of values representing Bezier curves which, when rendered, represents the textual content of the physical text source.

4. The method of claim 1, wherein identifying the final font for the glyphs of the first word based on the error metric comprises:
    determining that the error metric for the first word is less than a threshold; and
    selecting, for the glyphs of the first word, the final font as the dominant font.

5. A method comprising:
    receiving a plurality of glyphs;
    identifying a first character corresponding to a first glyph of the plurality of glyphs, and a second character corresponding to a second glyph of the plurality of glyphs;
    identifying a first font for the first glyph of the plurality of glyphs,
        wherein identifying the first font comprises:
            identifying a candidate font for the first glyph;
            determining that the candidate font is a most commonly used font for a related set of two or more of the plurality of glyphs;
            determining that the candidate font that is the most commonly used font is a dominant font for the related set of two or more of the plurality of glyphs; and
            identifying a final font for glyphs in the related set based at least in part on the dominant font;
    identifying a second font for the second glyph of the plurality of glyphs, wherein the second font is different than the first font, and wherein the first font and the second font are identified based on two or more of the plurality of glyphs; and
    generating a reflowable content file indicating the first character for the first glyph of the plurality of glyphs, the second character for the second glyph of the plurality of glyphs, the first font for the first glyph of the plurality of glyphs, and the second font for the second glyph of the plurality of glyphs.

6. The method of claim 5, wherein receiving the plurality of glyphs comprises:
    receiving an image of at least a portion of a physical text source; and
    segmenting the image into a plurality of character blocks, each character block comprising one of the plurality of glyphs.

7. The method of claim 6, wherein receiving the image comprises scanning the physical text source.

8. The method of claim 5, wherein identifying the first font for the first glyph comprises determining a signature vector for the first glyph and identifying the first font based on the signature vector for the first glyph.

9. The method of claim 8, wherein the signature vector for the first glyph comprises a value representing a center-of-mass or higher-order moment of the first glyph.

10. The method of claim 8, wherein the signature vector for the first glyph comprises a value representing an appearance of the first glyph.

11. The method of claim 8, wherein the signature vector for the first glyph is based on the first character for the first glyph.

12. The method of claim 8, wherein identifying the first font for the first glyph based on the signature vector for the first glyph comprises comparing the signature vector for the first glyph to a database of signature vectors.

13. The method of claim 5, wherein each set of the related set of two or more of the plurality of glyphs comprises at least one of a word, line, or a paragraph.

14. The method of claim 5, wherein the related set of two or more of the plurality of glyphs comprises a paragraph and the dominant font is identified based on a paragraph type of the paragraph, the paragraph type being at least one of a body paragraph, a heading paragraph, a header, a footer, a footnote, or a caption.

15. The method of claim 5, wherein identifying the final font comprises:
- determining an error metric indicative of a difference between two or more glyphs of the related set and a representation of the two or more glyphs of the related set generated using the dominant font;
- comparing the error metric to a threshold indicative of a likelihood that the two or more glyphs of the related set are part of the dominant font;
- determining that the error metric is less than a threshold; and
- selecting, for the two or more glyphs of the related set, the final font as the dominant font.

16. The method of claim 15, wherein the font different from the dominant font is a variant of the dominant font, the variant of the dominant font being at least one of a bold variant, an italic variant, an underlined variant or a strikethrough variant of the dominant font.

17. A non-transitory computer-readable medium having instructions encoded thereon which, when executed by a processing device, causes the processing device to perform operations comprising:
- receiving an image of at least a portion of a physical text source;
- segmenting the image into a plurality of character blocks, each character block comprising one of a plurality of glyphs;
- identifying a first font for a first glyph, wherein identifying the first font comprises:
  - analyzing shape and appearance characteristics of two or more of the plurality of glyphs;
  - identifying a candidate font for the first glyph;
  - determining that the candidate font is a most commonly used font for a related set of two or more of the plurality of glyphs;
  - determining that the candidate font that is the most commonly used font is a dominant font for the related set of two or more of the plurality of glyphs; and
  - identifying a final font for glyphs in the related set based at least in part on the dominant font;
- identifying a second font for a second glyph, the second font different than the first font; and
- generating a reflowable content file indicating characters, the first font and the second font.

18. The non-transitory computer-readable medium of claim 17, wherein identifying the first font comprises determining a signature vector comprising values indicative of shape and appearance characteristics for the first glyph and identifying the first font based at least in part on the signature vector for the first glyph.

19. The non-transitory computer-readable medium of claim 17, wherein identifying the final font comprises:
- determining an error metric indicative of a difference between two or more glyphs of the related set and a representation of the two or more glyphs of the related set generated using the dominant font;
- determining that the error metric above a threshold; and
- selecting, for the two or more glyphs of the related set, a final font as a font different from the dominant font.

20. The method of claim 1, wherein identifying the second font comprises:
- identifying a second candidate font for the second glyph;
- determining a second error metric for the second word of the paragraph indicative of a difference between glyphs of the second word and a representation of the glyphs of the second word generated using the dominant font;
- determining that the second error metric for the second word is above a threshold; and
- selecting, for the glyphs of the second word, a second final font that is different from the dominant font.

* * * * *